United States Patent
Tatoh

Patent Number: 5,945,721
Date of Patent: Aug. 31, 1999

[54] AIR-TIGHTLY SEALED CONTAINER FOR PHOTOSEMICONDUCTOR, AND PHOTOSEMICONDUCTOR MODULE

[75] Inventor: Nobuyoshi Tatoh, Itami, Japan

[73] Assignee: Sumitomo Electric Industries, Ltd., Osaka, Japan

[21] Appl. No.: 09/070,815

[22] Filed: May 1, 1998

[30] Foreign Application Priority Data

Jul. 30, 1997 [JP] Japan ................................ 9-204081

[51] Int. Cl.$^6$ ................ H01L 33/00; H01L 31/0232; H01L 23/02
[52] U.S. Cl. ........................ 257/434; 257/98; 257/680
[58] Field of Search ............... 257/98, 434, 680

[56] References Cited

U.S. PATENT DOCUMENTS 4,940,675  7/1990  Bohlayer et al. ................. 501/12

FOREIGN PATENT DOCUMENTS

| | | |
|---|---|---|
| 0 404 053 A2 | 12/1990 | European Pat. Off. . |
| 0 590 393 A1 | 4/1994 | European Pat. Off. . |
| 38 01938 A1 | 8/1989 | Germany . |
| 6-151629 | 5/1994 | Japan . |
| 8-148594 | 6/1996 | Japan . |
| WO 82/02800 | 8/1982 | WIPO . |

Primary Examiner—Teresa M. Arroyo
Attorney, Agent, or Firm—McDermott, Will & Emery

[57] ABSTRACT

A highly reliable air-tightly sealed container having a light transmissive window member formed of a borosilicate glass plate 4 and brazed to a cylindrical portion of a container side wall, the borosilicate glass plate being formed to a substantially right hexagonal shape and provided with a metallized portion 5 on an outer circumferential portion thereof with a circular light transmissive portion 6 left in the central part thereof, a diameter $L_1$ of a circle inscribing the outer circumference of the borosilicate glass plate 4 and a diameter $L_2$ of the light transmissive portion being in the relation of $L_2/L_1 \leq 0.85$. The thickness $L_3$ of the borosilicate glass plate is 0.11–0.25 times as large as the diameter $L_1$ mentioned above. The air-tightly sealed container uses a low-price borosilicate glass as the window member and free from the breakage of the borosilicate glass plate and the leakage of gas. A reliable photosemiconductor module can be obtained using the container.

16 Claims, 2 Drawing Sheets

AIR-TIGHTLY SEALED CONTAINER FOR PHOTOSEMICONDUCTOR, AND PHOTOSEMICONDUCTOR MODULE

BACKGROUND OF THE INVENTION

1. Field of the Invention

The present invention relates to an air-tightly sealed container provided with a light transmissive window unit for housing a photosemiconductor element therein, and a photosemiconductor module using this air-tightly sealed container for photosemiconductors.

2. Description of the Prior Art

In the optical communication, the air-tightness of a photosemiconductor module is regarded as important for the purpose of securing a high reliability. The reasons resides in that, in a high-temperature and high humidity condition, the electrodes of a photosemiconductor element is somewhat deteriorated with the water which enters the interior of the container and dews to cause the optical characteristics to be deteriorated. This makes it impossible to ensure the lifetime of not less than 10 years of the photosemiconductor element.

In a photosemiconductor module, a photosemiconductor element in a container and an optical fiber on the outer side of the container have to be connected together. In order to optically connect together the photosemiconductor element in the container and optical fiber on the outer side thereof with the air-tightness of the container secured, a light transmissive window structure is employed in the air-tightly sealed container for photosemiconductors.

As an example of such a light transmissive window structure, Japanese Patent Laid-Open No. 6-151629 discloses a window structure using a borosilicate glass plate as a window member, which is first seal-bonded to a ceramic or metallic carrier by using low melting point glass, the resultant complex body being then fixed to a container for photosemiconductors by brazing. Japanese Patent Laid-Open No. 8-148594 discloses a light transmissive window structure formed by brazing metallized sapphire to an inclined surface of a cylindrical fixed portion by using a Au—Sn alloy.

A glass plate used as a window member of a light transmissive window is generally formed to a substantially right hexagonal shape as a shape close to a circular shape, and coated at the whole surface with a nonreflective film. When the window member is constituted of an expensive material, such as sapphire, it is formed into a circular shape in a usual case by using a twist drill polishing machine so as to increase the yield of window member chips. However, since the borosilicate glass is inexpensive, the reduction of the manufacturing cost is principally aimed, i.e., the borosilicate glass is formed to a substantially right hexagonal window member by using an inexpensive linear machining process by dicing. In a machining process using only a linear action, small triangle-shaped cutting margins occur excessively. Since the borosilicate glass is cut to a substantially right hexagonal shape, the highest yield can be attained, though a linear machining method is used.

In such an air-tightly sealed container for photosemiconductors, a combination of different kinds of materials, such as a ceramic material, Cu—W alloy and Fe—Ni—Co alloy is used in view of the necessity of improving the heat-radiation characteristics and high-frequency characteristics. Consequently, thermal stress strain, which is ascribed to differences between the thermal expansion coefficients of different materials, has come to occur greatly during a brazing operation in the light transmissive window unit.

As disclosed in Japanese Patent Laid-Open No. 6-151629, i.e., in the method of seal-bonding a borosilicate glass plate constituting a window member to a ceramic or metallic carrier by low melting point glass, and then brazing the resultant composite body to a plate material of a large thickness, such as a container for photosemiconductors, the breakage of the glass plate occurs during a brazing operation in some cases where the thickness of the glass plate is small. This is caused by the fragility of the borosilicate glass which is higher than that of sapphire. The percentage of occurrence of imperfect products using borosilicate glass plates is as high as around 30%.

When a borosilicate glass plate is thick, the breakage thereof did not occur in a −65° C.~25° C.~150° C. heat cycle test based on MIL-STD but leakage based on MIL-STD occurred in around 20% products. This leakage occurs in a brazed portion between a carrier and a container for photosemiconductors. Namely, when the thickness of a glass plate increases, the glass plate becomes difficult to be broken owing to an increase in the strength but the glass plate becomes difficult to be deformed, so that a large stress is concentrated on the brazed portion to cause the brazing material to be broken in the heat cycle test.

In the case of a window member formed of a borosilicate glass plate, these two failure modes concerning the thickness thereof are thus superposed on each other, and, whatever thickness the glass plate is composed of, the glass plate falls into either of the two failure modes. Therefore, it was difficult to air-tightly seal a container in a satisfactory manner.

In a window structure using sapphire which is disclosed in Japanese Patent Laid-Open No. 8-148594, inconveniences concerning the above-mentioned two failure modes do not occur. The reasons reside in that the sapphire is high in strength, not fragile, and high in adhesion with respect to a metallized part. Accordingly, the sapphire enables a window member to be formed to a satisfactorily small thickness, and the occurrence of breakage of a glass or brazing material, which is encountered in a case where a borosilicate glass is used, to be prevented.

The sapphire is very expensive as known from the price of the same as a gem. As is understood from a recent internet unit, the cost reduction is essential to the popularization of optical communication, so that using an expensive sapphire as a window member is indeed a problem.

SUMMARY OF THE INVENTION

In view of these problems encountered in the conventional techniques, the present invention aims at providing an air-tightly sealed container for photosemiconductors, using an inexpensive borosilicate glass plate as a window member, free from the breakage of the borosilicate glass plate and leakage of a gas, and having a high reliability, and a semiconductor module using the same.

To achieve this object, the present invention provides an air-tightly sealed container for photosemiconductors, having a light transmissive window unit a window member of which is brazed to a cylindrical portion of a side wall of the container, wherein the window member is formed of a substantially right hexagonal borosilicate glass plate having metallized portion at an outer circumferential section thereof with a central section left as a circular light transmissive portion, a diameter $L_1$ of a circle inscribing an outer circumference of the borosilicate glass plate and that $L_2$ of the circular light transmissive portion in the central section having the relation $L_2/L_1 \leq 0.85$.

A photosemiconductor module provided by the present invention is formed so that at least one photosemiconductor element is mounted on the inner side of an air-tightly sealed container, according to the present invention with an optical fiber connected to an outer portion of the light transmissive window unit.

DETAILED DESCRIPTION OF THE PREFERRED EMBODIMENTS

According to the present invention, the relation between a diameter $L_1$ of a circle inscribing an outer circumference of a borosilicate glass plate and a diameter $L_2$ of a central circular light transmissive portion is set to $L_2/L_1 \leq 0.85$ by controlling the sizes of a metallized portion formed on the borosilicate glass plate constituting the window member, whereby it becomes possible that an excellent air-tightness of the container can be attained without encountering the breakage of the glass plate ascribed to the heat history during the manufacture thereof and in a later reliability test, and a gas leak ascribed to the breakage of a brazed portion.

Figure 1:
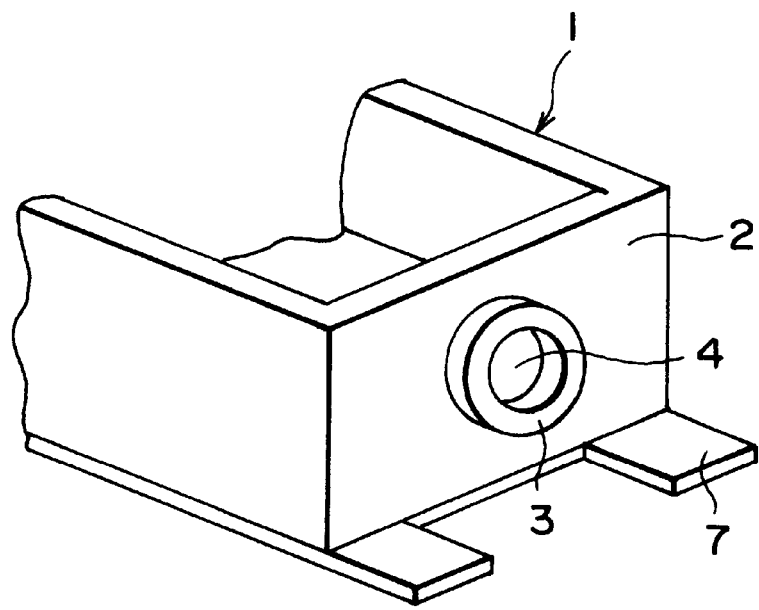
FIG. 1 is a schematic perspective view showing a light transmissive window unit of the air-tightly sealed container for photosemiconductors.
Figure 3:
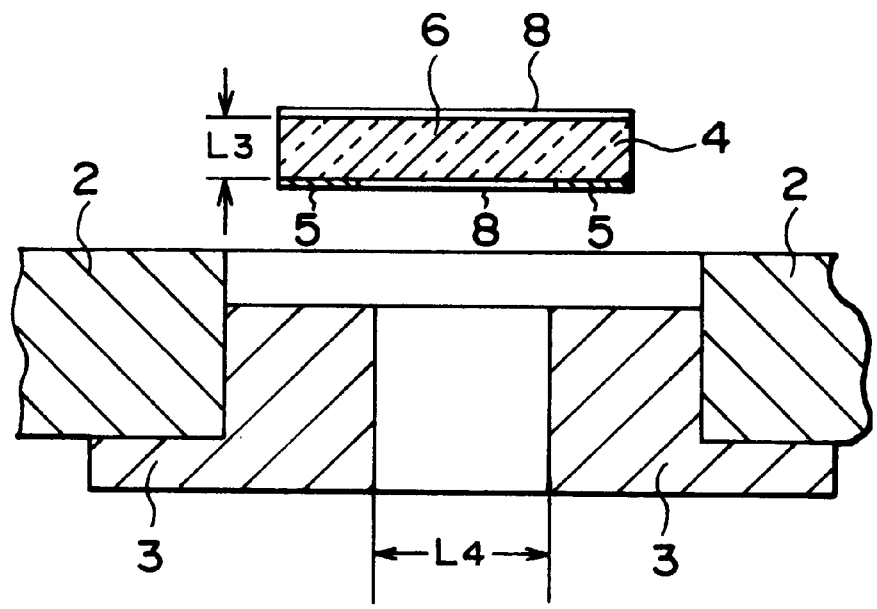
FIG. 3 is a schematic sectional view showing the condition of the borosilicate glass plate and cylindrical portion not yet fixed to each other.
Figure 4:
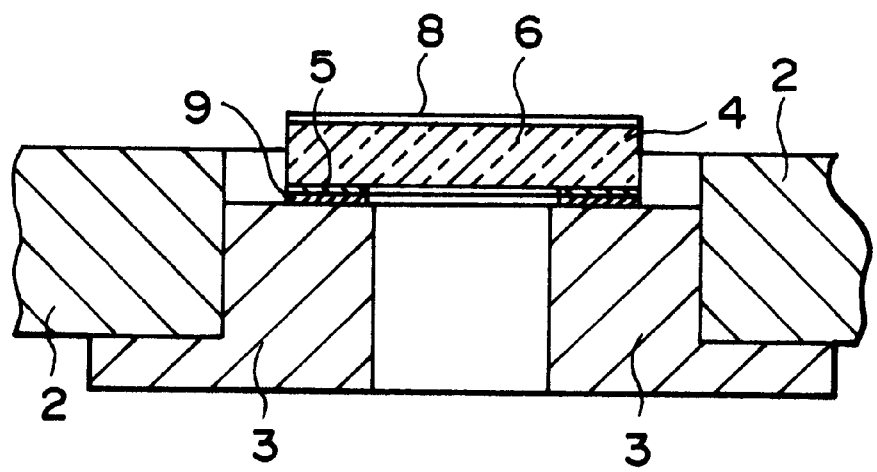
FIG. 4 is a schematic sectional view showing the cylindrical portion to which the borosilicate glass plate has been brazed.

In order to form a light transmissive windowpane in an air-tightly sealed container for photosemiconductors, a cylindrical member 3 is fitted in a hole made in a side wall 2 of an air-tightly sealed container 1, and brazed thereto, the product thus obtained being gold plated to form an intermediate product of the container as shown in FIGS. 1, 3 and 4. A window member is then bonded to this cylindrical portion 3 to form a light transmissive window unit. According to the present invention, the metallized portion 5 of the substantially right hexagonal borosilicate glass plate 4 is fixed by using a brazing material 8 of AuSn, as shown in FIG. 4.

Figure 2:
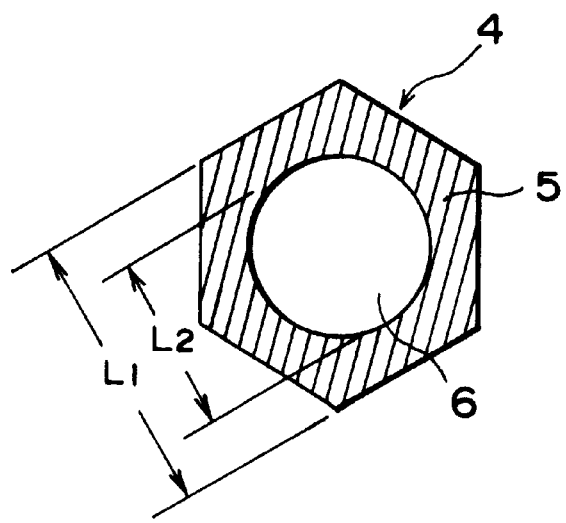
FIG. 2 is a plan view showing a borosilicate glass plate constituting the window member.

The substantially right hexagonal borosilicate glass plate 4, a window member is provided with a metallized portion 5 on one surface of a circumferential section thereof with a light transmissive portion 6 left in a central section thereof as shown in FIG. 2. When a diameter $L_2$ of the light transmissive portion 6 increases, the area of the metallized portion 5 relatively decreases. Therefore, the cracks in the brazing material 8 directly causes a gas leak. The length of a crack is limited, and, when the metallized portion 5 is set wider, i.e., when the diameter $L_2$ of the light transmissive portion 6 is set smaller, a gas leak tends to decrease.

When the thickness $L_3$ of the borosilicate glass plate 4 is small, cracks are liable to occur therein. In this case, when the diameter $L_2$ of the light transmissive portion of the substantially right hexagonal borosilicate glass plate 4 is then set larger, the stress imparted to the glass plate 4 is lessened, and cracks tend not to occur. When the thickness $L_3$ of the borosilicate glass plate 4 is large, the second moment of the sectional area increases to cause the glass plate to become difficult to be deformed, so that stress is concentrated on the metallized portion 5. When the diameter $L_2$ of the light transmissive portion 6 is increased in this case, the stress is dispersed, and the separation of the metallized portion 5 and cracks tend not to occur.

As long as the diameter of a circle $L_1$ inscribing the outer circumference of the substantially right hexagonal borosilicate glass plate 4 and that $L_2$ of the light transmissive portion 6 have the same ratio, the level of stress contributing to a breaking phenomenon becomes substantially equal even when the outer shape of the borosilicate glass plate 4 varies. On the basis of these knowledge, the ratio $L_2/L_1$ of the diameter $L_1$ to the diameter $L_2$ is set to not more than 0.85 in the present invention, whereby the excellent air-tightness of the container can be attained with respect to the heat history during the manufacture of the container and in a later reliability test.

The air-tightly sealed container 1 for photosemiconductors has a height of around 8 mm, and is provided with a bottom plate 7 and a cap seal (not shown). Accordingly, the diameter $L_1$ of a circle inscribing the outer circumference of the borosilicate glass plate 4 is usually not more than 5 mm. The thickness $L_3$ of the borosilicate glass plate 4 is preferably 0.11–0.25 times as large as the diameter $L_1$ of a circle inscribing the outer circumference thereof. The reasons reside in the following. When the thickness $L_3$ is smaller than 0.11 times the diameter $L_1$, cracks occur in some cases in the borosilicate glass plate 4, and, when the thickness $L_3$ exceeds 0.25 times the diameter $L_1$, the separation of the bonded surfaces of the borosilicate glass plate 4 and metallized portion 5 and the leakage of gas ascribed to cracks in the Au-Si brazing material 9 occur in some cases.

In order to form the metallized portion 5 on the borosilicate glass plate 4, it is preferable in view of the bonding strength thereof to laminate three layers of Cr/Pd/Au, Ti/Pd/Au, and Cr/Pt/Au or Ti/Pt/Au in the mentioned order on the glass surface. Although a sufficient thickness of Au constituting the outermost layer is not less than around 0.2 $\mu$m, it is preferable that this thickness be set to not more than 1 $\mu$m since the AuSn of the brazing material 9 and Au of the mentioned layer generate an alloy reaction in large quantities to cause the interface to become fragile when this thickness is too large. When the thickness of Cr or Ti of the innermost layer is larger than 0.3 $\mu$m, thermal stress increases, and the separation of the interface also increases. Therefore, this thickness is preferably not more than 0.3 $\mu$m, and, even when this thickness is around 0.1 $\mu$m, a sufficient bonding strength is obtained.

The window member is usually coated with a nonreflective film so as to operate a photosemiconductor module stably by decreasing the noise thereof, and increase an optical output therefrom. The nonreflective film 8 generally comprises a laminate of layers of silicate glass and titanate glass, and is provided on both surfaces of the borosilicate glass plate 4. However, since the strength of the bonded interface of the nonreflective film 8 and the metallized portion 5 is low, it is preferable that the nonreflective film 8 on the metallized portion be removed.

The brazing material 9 by which the borosilicate glass plate 4 is fixed to the cylindrical portion 3 of the air-tightly sealed container 1 preferably comprises an alloy of Au and Sn. When the thickness of the AuSn brazing material 9 differs, the stress distribution in the borosilicate glass plate varies, so that an increase in the length of cracks occurring in the metallized portion 5 and a decrease in the strength of the interface occur. Consequently, it is preferable that the thickness of the brazing material 9 comprising AuSn be set in the range of 0.08–0.12 mm. When the brazing temperature of AuSn exceeds 470° C. or lower than 450° C., the alloying rates of the metallized portion and AuSn vary to cause the interface strength of the borosilicate glass plate 4 and metallized portion 5 decrease. Therefore, in order to obtain good results, it is preferable that the brazing temperature of AuSn be set to 460° C. strictly in practice.

It is preferable that the diameter $L_4$ (diameter of a hole through which the light is passed) of the cylindrical portion 3 of the air-tightly sealed container 1 and that $L_2$ of the light transmissive portion 6, on which a metallized layer is not formed, of the borosilicate glass plate 4 be set as close as possible. However, when these two diameters do not agree with each other inevitably due to the dimensional tolerance occurring during the manufacture of the container, it is preferable that a difference between the two diameters $L_4, L_2$ be set not more than 0.05 times that $L_1$ of a circle inscribing the outer circumference of the borosilicate glass plate 4.

The material for the air-tightly-sealed container 1 may be a regularly used material, such as Fe—Ni—Co alloy including covar, Fe—Ni alloy including 42 alloy and Cu—W alloy. However, using a material the thermal expansion coefficient of which is close to that of the borosilicate glass plate 4 is preferable for the reduction of the thermal stress. The thermal expansion coefficient of the borosilicate glass is around $4-7 \times 10^{-6}/°C$. When the material for the air-tightly sealed container 1 is different from that mentioned above with the window member having to comprise glass the thermal expansion coefficient of which is different from that of the borosilicate glass as a material for the window member, glass containing Pb and Na may be used.

Therefore, when the side wall 2 of the container is formed of a material the thermal expansion coefficient of which is $4.5 \times 10^{-6} - 6.5 \times 10^{-6}/°C$., for example, covar, it is preferable that the cylindrical portion 3 be formed out of a material the thermal expansion coefficient of which is within $\pm 0.3 \times 10^{-6}/°C$. of that of the borosilicate glass plate 4 and equal to or not higher than that of the container side wall 2, for example, covar.

When the container side wall is formed of Cu—W of a thermal expansion coefficient of $6.5 \times 10^{-6} - 9.0 \times 10^{-6}/°C$., it is preferable that Fe—Ni—Co alloy of a thermal expansion coefficient of $4.5 \times 10^{-6} - 5.5 \times 10^{-6}/°C$. be used to form the cylindrical portion 3. In this case, it is preferable that the diameter $L_1$ of the borosilicate glass plate 4 and that $L_2$ of the light transmissive portion be regulated in accordance with the relation between the diameter $L_1$ of a circle inscribing the outer circumference of the borosilicate glass plate 4 and the thickness $L_3$ thereof.

More specifically, when the thickness $L_3$ of the borosilicate glass plate 4 is not less than 0.125 times the diameter $L_1$ and less than 0.141 times the same, the diameter $L_1$ and diameter $L_2$ of the light transmissive portion are preferably set to $0.7 \leq L_2/L_1 < 0.8$. Similarly, it is preferable that the diameters be set to $0.6 \leq L_2/L_1 < 0.8$ when the thickness $L_3$ is not less than 0.141 times the diameter $L_1$ and less than 0.156 times the same, that the diameters be set to $0.55 \leq L_2/L_1 < 0.8$ when the thickness $L_3$ is not less than 0.156 times the diameter $L_1$ and less than 0.172 times the same, that the diameters be set to $0.5 \leq L_2/L_1 < 0.7$ when the thickness $L_3$ is not less than 0.172 times the diameter $L_1$ and less than 0.188 times the same, and that the diameters be set to $0.45 \leq L_2/L_1 < 0.65$ when the thickness $L_3$ is not less than 0.188 times the diameter $L_1$ and less than 0.203 times the same.

When the container side wall 2 formed of Cu—W, etc., of $6.5 \times 10^{-6} - 9.0 \times 10^{-6}/°C$. in thermal expansion coefficient with the cylindrical portion 3 formed of an Fe—Ni alloy, such as 42 alloy of not more than $6.0 \times 10^{-6} - 7.0 \times 10^{-6}/°C$. in thermal expansion coefficient, it is preferable that the thermal expansion coefficient of the borosilicate glass plate 4 be within the range of $\pm 0.1 \times 10-6/°C$. of that of the cylindrical portion 3.

A photosemiconductor module can be formed by using the above-described air-tightly sealed container for photosemiconductors, wherein at least one photosemiconductor element is mounted in the interior of the container with an optical fiber connected to an outer portion of a light transmissive window unit. The air-tightly sealed container for photosemiconductors and the photosemiconductor module have excellent air-tightness and attain low manufacturing costs owing to the use of borosilicate glass.

EXAMPLE 1

As shown in FIG. 1, an air-tightly sealed container 1 was formed at all of the container side wall 2, the cylindrical portion 3 and the bottom plate 7 out of covar, i.e., an alloy of Fe—Ni—Co (the thermal expansion coefficient of which was $5.0 \times 10^{-6}/°C$.), and a covar pin was sealed as a terminal to the container 1 with glass of a low melting point, the resultant product being subjected to nickel plating and gold plating. A window member bonded to the cylindrical portion 3 was formed of a substantially right hexagonal borosilicate glass plate 4 (having a thermal expansion coefficient of $5.1 \times 10^{-6}/°C$.).

As shown in FIG. 2, the metallized portion 5 comprising three layers of Cr/Pd/Au laminated in the mentioned order on a central portion of one surface of the borosilicate glass plate 4 was provided. The diameter $L_1$ of a circle inscribing an outer circumference of the substantially right hexagonal borosilicate glass plate 4 was set to 3.2 mm, and the diameter $L_2$ of the light transmissive portion 6 left in the central portion of the metallized portion 5 was 2.72 mm ($L_2/L_1 = 0.85$). The thickness $L_3$ of the borosilicate glass plate 4 was 0.30 mm. The nonreflective films 8 on both surfaces of the borosilicate glass plate 4 were cut off in advance at the portions thereof on which the metallized portion 5 was provided, as shown in FIG. 3.

This borosilicate glass plate 4 was fixed to the cylindrical portion 3, the inner diameter $L_4$ of which was 2.88 mm, by using the brazing material 9 comprising an Au—Sn alloy, as shown in FIGS. 3 and 4. The air-tightly sealed container 1 obtained did not encounter the occurrence of cracks in the borosilicate glass plate 4 during the manufacture thereof and also during reliability tests therefore, and the leakage of gas ascribed to cracks in the metallized portion 5 or the brazing material 9 was not found. It was ascertained that this air-tightly sealed container 1 had a high reliability.

The reliability tests included a 100°–0° C. liquid layer cold heat impact test, a 250°×5 min×5 times solder heat-resistance test and a heat cycle test in which −65° C.−25° C.−150° C. was applied 1000 cycles (the same applies to the following Examples).

EXAMPLE 2

In an air-tightly sealed container 1 of this Example 2, the sizes were set in the same manner as in Example 1 except those of a window member. A bottom plate 7 was formed out of a Cu—W alloy (having a thermal expansion coefficient of $8.3 \times 10^{-6}/°C$.), and a container side wall 2 and the cylindrical portion 3 were formed out of covar (having a thermal expansion coefficient of $5.0 \times 10^{-6}/°C$.). On the borosilicate glass plate 4 (having a thermal expansion coefficient of $5.1 \times 10^{-6}/°C$.), the metallized portion 5 comprising three layers Cr/Pd/Au was formed so that these layers were laminated in the mentioned order from the glass plate side.

In the substantially right hexagonal borosilicate glass plate 4, the diameter $L_1$ of a circle inscribing the outer circumference thereof was set to 3.2 mm (fixed), and the diameter $L_2$ of the light transmissive portion 6 and the thickness $L_3$ thereof were varied in different samples.

Namely, the diameter $L_2$ of light transmissive portion 6 was varied to 0.96, 1.12, 1.25, 1.44, 1.6, 1.76, 1.92, 2.08, 2.24, 2.4, 2.56, 2.72 and 2.88 in order, and the thickness $L_3$ thereof 0.30, 0.35, 0.40, 0.45, 0.50, 0.55, 0.60, 0.65, 0.70, 0.75, 0.80 and 0.85 in order so that $L_2/L_1$ (lateral column) and $L_3/L_1$ (vertical column) had the values shown in the following table.

These borosilicate glass plates 4 were brazed by the AuSn alloy in the same manner as in Example 1 to produce air-tightly sealed containers 1. Each of the containers thus obtained was subjected to reliability tests, which were the same tests that were conducted in Example 1, and the results were also shown in Table 1. Each of the following tables, air-tightly sealed containers of a good quality were shown by the symbol ○, and imperfect containers in which the leakage of a gas occurred by different symbols by the failure modes, i.e., the containers with breakage of glass plate being shown by x1, the containers with the separation of interfaces of the glass plate and metallized portion being shown by x2, the containers with cracks in the brazing material being shown by x3.

cylindrical portion 3 having been formed out of covar (having a thermal expansion coefficient of $5.0 \times 10^{-6}/°C$). On the borosilicate glass plate 4 (having a thermal expansion coefficient of $5.1 \times 10^{-6}/°C$), the metallized portion 5 comprising three layers of Cr/Pd/Au laminated in the mentioned order was formed from the glass plate side.

In the substantially right hexagonal borosilicate glass plate 4, the diameter $L_1$ of a circle inscribing the outer circumference thereof was set to 3.2 mm (fixed), and the diameter $L_2$ of the light transmissive portion 6 was varied to 0.96, 1.12, 1.25, 1.44, 1.6, 1.76, 1,92, 2.08, 2.24, 2.4, 2.56, 2.72 and 2.88 in order with the thickness $L_3$ also varied to 0.30, 0.35, 0.40, 0.45, 0.50, 0.55, 0.60, 0.65, 0.70, 0.75, 0.80 and 0.85 in order in the same manner as in Example 1 so that $L_2/L_1$ (lateral column) and $L_3/L_1$ (vertical column) had the values shown in the following table.

TABLE 1

| $L_3/L_1$: | $L_2/L_1$ (Lateral column) | | | | | | | | | | | | |
|---|---|---|---|---|---|---|---|---|---|---|---|---|---|
| (Vertical column) | 0.30 | 0.35 | 0.40 | 0.45 | 0.50 | 0.55 | 0.60 | 0.65 | 0.70 | 0.75 | 0.80 | 0.85 | 0.90 |
| 0.094: | x1 | x1 | x1 | x1 | x1 | x1 | x1 | x1 | x1 | x1 | x1 | x3 | x3 |
| 0.110: | x1 | x1 | x1 | x1 | x1 | x1 | x1 | x1 | x1 | x1 | ○ | x3 | x3 |
| 0.125: | x1 | x1 | x1 | x1 | x1 | x1 | ○ | ○ | ○ | ○ | ○ | x3 | x3 |
| 0.141: | x1 | x1 | x1 | x1 | ○ | ○ | ○ | ○ | ○ | ○ | ○ | x3 | x3 |
| 0.156: | x1 | x1 | ○ | ○ | ○ | ○ | ○ | ○ | ○ | ○ | ○ | x3 | x3 |
| 0.172: | ○ | ○ | ○ | ○ | ○ | ○ | ○ | ○ | ○ | ○ | ○ | x3 | x3 |
| 0.188: | ○ | ○ | ○ | ○ | ○ | ○ | ○ | ○ | ○ | ○ | ○ | x3 | x3 |
| 0.203: | ○ | ○ | ○ | ○ | ○ | ○ | ○ | ○ | ○ | ○ | ○ | x3 | x3 |
| 0.219: | ○ | ○ | ○ | ○ | ○ | ○ | ○ | ○ | x2 | x2 | x2 | x3 | x3 |
| 0.234: | ○ | ○ | ○ | ○ | ○ | ○ | x2 | x2 | x2 | x2 | x2 | x3 | x3 |
| 0.250: | ○ | ○ | ○ | ○ | x2 | x2 | x2 | x2 | x2 | x2 | x2 | x3 | x3 |
| 0.266: | x2 | x2 | x2 | x2 | x2 | x2 | x2 | x2 | x2 | x2 | x2 | x3 | x3 |

EXAMPLE 3

In the air-tightly sealed container of Example 3, the sizes were set in the same manner as in Example 1 except those of a window member, and the bottom plate 7 and the container side wall 2 were formed out of a Cu—W alloy (having a thermal expansion coefficient of $8.3 \times 10^{-6}/°C$), the These borosilicate glass plates 4 were brazed by using the AuSn alloy in the same manner as in Example 1 to produce the air-tightly sealed containers 1. Each of the containers thus obtained was subjected to each reliability test in the same manner as in Example 1. The results were also shown in Table 2. The evaluation symbols shown in Table 2 signify the same things as in Example 1.

TABLE 2

| $L_3/L_1$: | $L_2/L_1$ (Lateral column) | | | | | | | | | | | | |
|---|---|---|---|---|---|---|---|---|---|---|---|---|---|
| (Vertical column) | 0.30 | 0.35 | 0.40 | 0.45 | 0.50 | 0.55 | 0.60 | 0.65 | 0.70 | 0.75 | 0.80 | 0.85 | 0.90 |
| 0.094: | x1 | x1 | x1 | x1 | x1 | x1 | x1 | x1 | x1 | x1 | x1 | x3 | x3 |
| 0.110: | x1 | x1 | x1 | x1 | x1 | x1 | x1 | x1 | x1 | x1 | x2 | x3 | x3 |
| 0.125: | x1 | x1 | x1 | x1 | x1 | x1 | x1 | x1 | ○ | ○ | x2 | x3 | x3 |
| 0.141: | x1 | x1 | x1 | x1 | x1 | x1 | ○ | ○ | ○ | ○ | x2 | x3 | x3 |
| 0.156: | x1 | x1 | x1 | x1 | x1 | ○ | ○ | ○ | ○ | ○ | x2 | x3 | x3 |
| 0.172: | x1 | x1 | x1 | x1 | ○ | ○ | ○ | ○ | ○ | x2 | x2 | x3 | x3 |
| 0.188: | x1 | x1 | x1 | ○ | ○ | ○ | ○ | x2 | x2 | x2 | x2 | x3 | x3 |
| 0.203: | x2 | x2 | x2 | x2 | x2 | x2 | x2 | x2 | x2 | x2 | x2 | x3 | x3 |
| 0.219: | x2 | x2 | x2 | x2 | x2 | x2 | x2 | x2 | x2 | x2 | x2 | x3 | x3 |
| 0.234: | x2 | x2 | x2 | x2 | x2 | x2 | x2 | x2 | x2 | x2 | x2 | x3 | x3 |
| 0.250: | x2 | x2 | x2 | x2 | x2 | x2 | x2 | x2 | x2 | x2 | x2 | x3 | x3 |
| 0.266: | x2 | x2 | x2 | x2 | x2 | x2 | x2 | x2 | x2 | x2 | x2 | x3 | x3 |

EXAMPLE 4

In the air-tightly sealed container 1 of this Example 4, the sizes were set equal to those of Example 1 except those of a window member, and the bottom plate 7 and the container side wall 2 were formed out of a Cu—W alloy (having a thermal expansion coefficient of $8.3 \times 10^{-6}/°C$.), the cylindrical portion 3 having been formed out of 42 alloy (having a thermal expansion coefficient of $6.5 \times 10^{-6}/°C$.) comprising an Fe—Ni alloy. On the borosilicate glass plate 4 (having a thermal expansion coefficient of $6.5 \times 10^{-6}/°C$.), the metallized portion 5 comprising three layers of Cr/Pd/Au laminated in the mentioned order was formed in the same manner as in Example 1 from the glass plate side. The diameter $L_1$ of a circle inscribing the outer circumference of the borosilicate glass plate 4 was set to 3.2 mm, and the diameter $L_2$ of a light transmissive portion 6 was set to 2.0 mm ($L_2/L_1 = 0.625$). The thickness $L_3$ of the borosilicate glass plate 4 was 0.5 mm.

This borosilicate glass plate 4 was fixed to the cylindrical portion 3 by using the brazing material 9 comprising an Au—Sn alloy, as shown in FIGS. 3 and 4. The air-tightly sealed container 1 thus obtained did not encounter the breakage of the borosilicate glass plate 4 and the leakage of gas ascribed to cracks in the metallized portion 5 or the brazing material 9, during the manufacture of the container and the later reliability tests therefor, and proved to be highly reliable. A LD module, a photosemiconductor module using this air-tightly sealed container 1 could be produced highly reliably at a low cost.

According to the present invention, it is possible to provide an air-tightly sealed container for photosemiconductors, which is free from the breakage of a borosilicate glass plate and the leakage of gas in spite of the use of a low-price substantially right hexagonal window member of borosilicate glass, and which has a high reliability, and a photosemiconductor module using the same.

What is claimed is:

1. An air-tightly sealed container for photosemiconductors, having a light transmissive window unit, a window member of which is brazed to a cylindrical portion of a side wall of the container using a brazing material, wherein the window member is formed of a substantially right hexagonal borosilicate glass plate having a metallized portion at an outer circumferential section thereof with a central section left as a circular light transmissive portion, a diameter $L_1$ of a circle inscribing an outer circumference of the borosilicate glass plate and that $L_2$ of the circular light transmissive portion in the central section having the relation of $L_2/L_1 \leq 0.85$.

2. An air-tightly sealed container for photosemiconductors according to claim 1, wherein the diameter $L_1$ of a circle inscribing an outer circumference of the borosilicate glass plate is not more than 5 mm, a thickness $L_3$ of the borosilicate glass plate being 0.11–0.25 times as large as the diameter $L_1$.

3. An air-tightly sealed container for photosemiconductors according to claim 1, wherein the brazing material comprises an alloy of Au and Sn and has a thickness of 0.08–0.12 mm.

4. An air-tightly sealed container for photosemiconductors according to claim 1, wherein the metallized portion comprises three layers including layers of Cr or Ti/Pd or Pt/Au laminated in the mentioned order on a surface of the borosilicate glass plate.

5. An air-tightly sealed container for photosemiconductors according to claim 4, wherein a thickness of the outermost layer of Au of the metallized portion is not more than 1 μm.

6. An air-tightly sealed container for photosemiconductors according to claim 4, wherein a thickness of the innermost layer of Cr or Ti of the metallized portion is not more than 0.3 μm.

7. An air-tightly sealed container for photosemiconductors according to claim 1, wherein a glass surface of the light transmissive portion is coated with a nonreflective film comprising a laminate of silicate glass and titanate glass.

8. An air-tightly sealed container for photosemiconductors according to claim 1, wherein a difference between an inner diameter $L_4$ of the cylindrical portion and the diameter $L_2$ of the light transmissive portion of the borosilicate glass plate is not more than 0.05 times the diameter $L_1$ of a circle inscribing the outer circumference of the borosilicate glass plate.

9. An air-tightly sealed container for photosemiconductors according to claim 1, wherein the side wall of the container is formed of a material of a thermal expansion coefficient of $4.5 \times 10^{-6} – 6.5 \times 10^{-6}/°C$., a thermal expansion coefficient of the cylindrical portion being within the range of $\pm 0.3 \times 10^{-6}/°C$. of the borosilicate glass plate and agreeing with or being not higher than that of the side wall.

10. An air-tightly sealed container for photosemiconductors according to claim 1, wherein the side wall of the container is formed of Cu—W of a thermal expansion coefficient of $6.5 \times 10^{-6} – 9.0 \times 10^{-6}/°C$., the cylindrical portion being formed of an Fe—Ni—Co alloy of a thermal expansion coefficient of $4.5 \times 10^{-6} – 5.5 \times 10^{-6}/°C$., the thickness $L_3$ of the borosilicate glass plate being not less than 0.125 times the diameter of a circle inscribing an outer circumference of the borosilicate glass plate and less than 0.141 times the same, the $L_1$ and the diameter $L_2$ of the light transmissive portion having the relation of $0.7 \leq L_2/L_1 < 0.8$.

11. An air-tightly sealed container for photosemiconductors according to claim 1, wherein the side wall of the container is formed of Cu—W of a thermal expansion coefficient of $6.5 \times 10^{-6} – 9.0 \times 10^{-6}/°C$., the cylindrical portion being formed of an Fe—Ni—Co alloy of a thermal expansion coefficient of $4.5 \times 10^{-6} – 5.5 \times 10^{-6}/°C$., the thickness $L_3$ of the borosilicate glass plate being not less than 0.141 times the diameter $L_1$ of a circle inscribing the outer circumference of the borosilicate and less than 0.156 times the same, the $L_1$ and the diameter $L_2$ of the light transmissive portion having the relation of $0.6 \leq L_2/L_1 < 0.8$.

12. An air-tightly sealed container for photosemiconductors according to claim 1, wherein the side wall of the container is formed of Cu—W of a thermal expansion coefficient of $6.5 \times 10^{-6} – 9.0 \times 10^{-6}/°C$., the cylindrical portion being formed of an Fe—Ni—Co alloy of a thermal expansion coefficient of $4.5 \times 10^{-6} – 5.5 \times 10^{-6}/°C$., the thickness $L_3$ of the borosilicate glass plate being not less than 0.156 times the diameter $L_1$ of a circle inscribing the outer circumference of the borosilicate glass plate and less than 0.172 times the same, the $L_1$ and the diameter $L_2$ of the light transmissive portion having the relation of $0.55 \leq L_2/L_1 < 0.8$.

13. An air-tightly sealed container for photosemiconductors according to claim 1, wherein the side wall of the container is formed of Cu—W of a thermal expansion coefficient of $6.5 \times 10^{-6} – 9.0 \times 10^{-6}/°C$., the cylindrical portion being formed of an Fe—Ni—Co alloy of a thermal expan- sion coefficient of $4.5 \times 10^{-6} – 5.5 \times 10^{-6}/°C$., the thickness $L_3$ of the borosilicate glass plate being not less than 0.172 times the diameter $L_1$ of a circle inscribing the outer circumference of the borosilicate glass plate and less than 0.188 times the same, the $L_1$ and the diameter $L_2$ of the light transmissive portion having the relation of $0.5 \leq L_2/L_1 < 0.75$.

14. An air-tightly sealed container for photosemiconductors according to claim 1, wherein the side wall of the container is formed of Cu—W of a thermal expansion coefficient of $6.5\times10^{-6}$–$9.0\times10^{-6}$/°C., the cylindrical portion being formed of an Fe—Ni—Co alloy of a thermal expansion coefficient of $4.5\times10^{-6}$–$5.5\times10^{-6}$/°C., the thickness $L_3$ of the borosilicate glass plate being not less than 0.188 times the diameter $L_1$ of a circle inscribing the outer circumference of the borosilicate glass plate and less than 0.203 times the same, the $L_1$ and the diameter $L_2$ of the light transmissive portion having the relation of $0.45 \leq L_2/L_1 < 0.65$.

15. An air-tightly sealed container for photosemiconductors according to claim 1, wherein said side wall of said container is formed of Cu—W of a thermal expansion coefficient of $6.5\times10^{-6}$–$9.0\times10^{-6}$/°C., the cylindrical portion being formed of an Fe—Ni alloy of a thermal expansion coefficient of not more than $6.0\times10^{-6}$–$7.0\times10^{-6}$/°C., a thermal expansion coefficient of the borosilicate glass plate being within the range of $\pm0.1\times10^{-6}$/°C. of the thermal expansion coefficient of the cylindrical portion.

16. A photosemiconductor module, wherein at least one photosemiconductor element is mounted on the inner side of the air-tightly sealed container for photosemiconductors according to claim 1, an optical fiber being connected to an outer portion of the light transmissive window unit.

* * * * *